(12) United States Patent
Stevens

(10) Patent No.: US 7,016,605 B2
(45) Date of Patent: Mar. 21, 2006

(54) FAULT TOLERANT OPTICAL SWITCH ARCHITECTURE

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 694 days.

(21) Appl. No.: 10/045,757

(22) Filed: Oct. 19, 2001

(65) Prior Publication Data

US 2003/0076557 A1    Apr. 24, 2003

(51) Int. Cl.
*H04B 10/08* (2006.01)
*H04J 14/00* (2006.01)

(52) U.S. Cl. .......................................... 398/19; 398/45

(58) Field of Classification Search .................... 398/1, 398/2, 19, 12, 45, 50
See application file for complete search history.

(56) References Cited

U.S. PATENT DOCUMENTS

| | | | |
|---|---|---|---|
| 5,883,998 A * | 3/1999 | Stevens et al. | |
| 5,892,605 A * | 4/1999 | Stevens | |
| 6,243,180 B1 * | 6/2001 | Kanterakis et al. | |
| 2002/0105696 A1 * | 8/2002 | Halgren | 359/128 |
| 2003/0011844 A1 * | 1/2003 | Park et al. | 359/128 |
| 2003/0039007 A1 * | 2/2003 | Ramadas et al. | 359/128 |
| 2003/0039014 A1 * | 2/2003 | English | 359/163 |

OTHER PUBLICATIONS

L. Wosinska et al., "Large-Capacity Strictly Nonblocking Optical Cross-Connects Based on Micro-electro-opto-mechanical Systems (MEOMS) Switch Matrices: Reliability Performance Analysis", Journal of Lightwave Technology, vol. 19, No. 8, Aug. 2001.*

* cited by examiner

*Primary Examiner*—M. R. Sedighian
*Assistant Examiner*—Shi K. Li

(57) ABSTRACT

A fault tolerant optical switch architecture improves the level of reliability in an optical communication system by incorporating an optical switch backup that engages quickly upon notification of a failure mode of a primary switch. In an example embodiment, an arrangement for optical communication between first and second nodes includes a first optical switch having first-switch transmit and receive channels and a second optical switch having second-switch transmit and receive channels. The first and second optical switches of the optical communications arrangement conduct self-tests and indicate whether the self-tests have failed. The arrangement also includes an optical coupler that receives the first-switch and second-switch transmit channels and provides an output for transmit to at least one of the first and second nodes. The arrangement further includes an optical splitter that receives an optical signal coupled from at least one of the first and second nodes and provides an output coupled to the first-switch and second-switch receive channels. Also included is a control circuit that can be built into one or both of first and second optical switches for self-activation in response to the other of the first and second optical switches conducting the self-test.

17 Claims, 3 Drawing Sheets

FAULT TOLERANT OPTICAL SWITCH ARCHITECTURE

FIELD OF THE INVENTION

The present invention generally relates to optical communication systems and, more particularly, to fault-tolerant optical switch interconnects that can improve reliability and reduce the costs to manufacture the optical communication system.

BACKGROUND

The speed and bandwidth of data transmission over fiber optic cable renders optical fiber communication particularly advantageous for certain applications. Optical fiber communication systems typically include optical transmitters that communicate with optical receivers via an optical fiber cable. Optical fiber communication systems are typically connected to electrical systems via optical switches. These optical switches usually include optoelectronic components that convert electrical signals from the electrical systems into optical signals that can be routed through the optical communication system. Optical switch interconnects are coupled to the output of optical switches to facilitate communications between the optical switches and other components in the optical communication system. In one example, the optical switch interconnect includes an optical backpanel populated with optical connectors.

Using a single optical switch at certain points within the communication system can lead to an entire system failure if a critical switch fails or if the connection to the critical switch fails. To prevent such a system failure, a different approach could use a redundant optical channel with an additional switch coupled to each of the communicating nodes, where the redundant optical channel is used as a backup in the event of a failure to any of the components along the first channel. This approach requires incorporating an additional interface card at each of the communicating nodes and coupling the communicating nodes to both switches. Such additional circuitry is undesirable from a cost-complexity vantage point.

Accordingly, there is a need for a method and an arrangement that addresses the aforementioned problems. More particularly, there is a need for a method and an arrangement that lessens the risk of system failure and does not involve unnecessary expense and complexity.

SUMMARY OF THE INVENTION

In various embodiments, the invention provides a fault tolerant optical switch architecture that facilitates a switch over to a backup optical switch when a fault is detected at a primary switch before the optical communication system is initialized. The present approach simplifies retrofitting an existing optical communication system with an optical switch backup for a primary optical switch without increasing the expense and complexity of the overall system.

According to one aspect of the invention, an arrangement adapted for optical communication between first and second nodes includes a first optical switch having first-switch transmit and receive channels and a second optical switch having second-switch transmit and receive channels. At least one of the first and second optical switches of the optical communication arrangement conducts a self-test and indicates whether the self-test has failed. The arrangement also includes an optical coupler that receives the first-switch and second-switch transmit channels and provides an output that is transmitted to at least one of the first and second nodes. The arrangement further includes an optical splitter that receives an optical signal coupled from at least one of the first and second nodes and provides an output for the first-switch and second-switch receive channels. Also included is a control circuit that can be built into one or both of first and second optical switches for self-activation in response to the other of the first and second optical switches conducting the self-test.

According to another aspect of the invention, an arrangement adapted for optical communication with a first node includes a first optical switch having first-switch transmit and receive channels and a second optical switch having second-switch transmit and receive channels. At least one of the first and second optical switches of the optical communication arrangement conducts a self-test and indicates whether the self-test has failed. The arrangement also includes an optical coupler that receives the first-switch and second-switch transmit channels and provides an output for transmit to the first node. The arrangement further includes an optical splitter that receives an optical signal coupled from the first node and provides an output coupled to the first-switch and second-switch receive channels. Also included is a control circuit that can be built into one or both of first and second optical switches for self-activation in response to the other of the first and second optical switches conducting the self-test.

In a related embodiment, the above described arrangement further includes a second optical coupler that receives the first-switch and second-switch transmit channels and provides an output for transmit to a second node. The arrangement also includes a second optical splitter that receives an optical signal coupled from the second node and provides an output coupled to the first-switch and second-switch receive channels.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings in which.

DETAILED DESCRIPTION

The present invention is generally directed to a fault tolerant optical switch architecture that improves the level of reliability in an optical communication system by incorporating an optical switch backup arrangement that engages quickly upon notification of a failure mode of a primary switch. While the present invention is not necessarily limited to such an application, the invention will be better appreciated using a discussion of example embodiments in such a specific context.

In an example embodiment, the invention is directed to communications from one node to another node occurring transparently through one of two optical switches, although only one switch is active during communications. The primary and secondary optical switches are configured such that any optical switch failure is resolved without the need for additional backup node interfaces and without latency, bandwidth or connectivity problems. A fault tolerant optical switch interconnect facilitates switching over to a secondary optical switch from a primary optical switch when a self-test conducted by each optical switch at start up indicates that the primary switch has failed. A transmit optical link of the node is split between the receive inputs of the primary and the secondary switches, while a receive optical link of the node couples the output of the respective transmit outputs of the primary and secondary switches.

Figure 1:
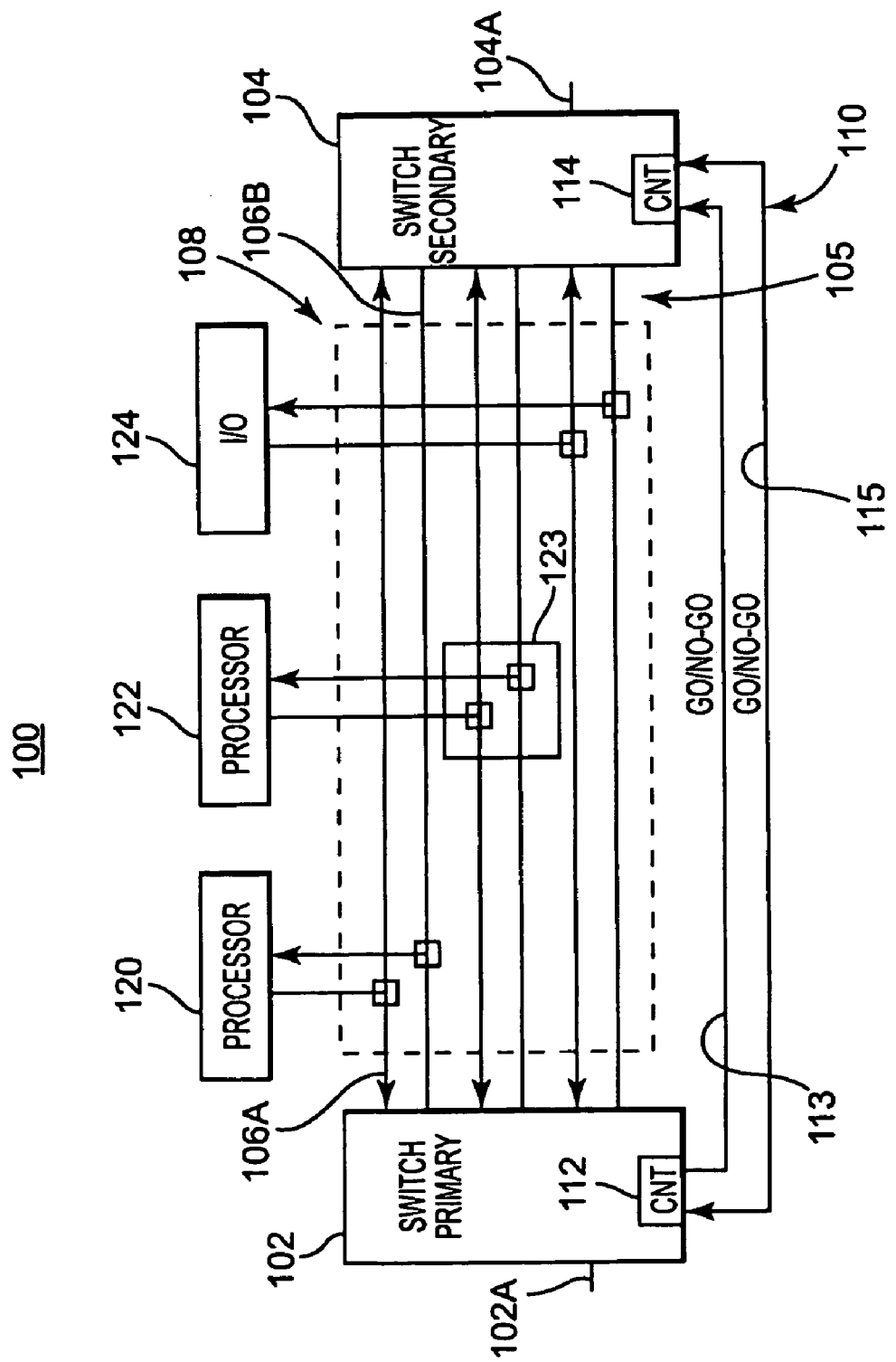
FIG. 1 is a block diagram of an optical switch architecture that includes a secondary optical switch as a backup for a primary optical switch made in accordance with an example embodiment of the present invention.

FIG. 1 illustrates another example embodiment by way of a block diagram of an optical switch architecture or system 100, system 100 including a secondary optical switch 104 that acts as a backup for a primary optical switch 102. In this example embodiment, each of the primary and secondary switches communicates over a plurality of ports 105, with each port including transmit and receive channels 106A and 106B. Switches 102 and 104 are optically coupled via optical components disposed on an optical backplane or backpanel 108. The respective transmit and receive channels of switches 102 and 104 are coupled with each other on optical backplane 108. Switches 102, 104 and backplane 108 together facilitate communications between various nodes. In this example, the communicating nodes include a first processor 120, a second processor 122 and an I/O device 124.

Communicating nodes 120-124 communicate with each other through an active optical switch using the Fibre Channel ANSI standard X3T9.3 protocol. In this protocol, a node sends a message to another node that includes the destination data encoded in the header data of the data packet structure of the message. The optical switch uses the header data to route the message to the proper receiving node. In one more specific example embodiment, a return message automatically acknowledges receipt of the message. In another specific embodiment, the node sends a "telegram" message without sending a return message to the communicating node. The present invention is adaptable to other systems using the protocols that operate in ATM or FDDI systems.

Under normal operating conditions, primary switch 102 is automatically set to communicate with other nodes or devices in system 100, such as processors 120 and 122, via a node interface (e.g., node interface 123) which is located on optical backplane 108. Primary switch 102 is the default switch and is selected first by system 100 by using a high pin 102A. Secondary switch 104 is the backup switch and is selected by using a low pin 104A.

Switches 102 and 104 establish bi-directional communications and negotiate which switch will engage at the time the optical communication system is initialized. Although primary switch 102 is favored as the default switch, if the switch verification and selection process (e.g., during start up) determines that switch 102 is not operating properly or that a connection to switch 102 is inoperative, secondary switch 104 engages. The nodes (e.g., processors 120 and 122 and I/O device 124) are not aware or otherwise are not affected by the optical switch verification and selection process and the physical arrangement of optical switches 102 and 104. Devices 120–124 transmit and receive signals only to and from a single switch although the devices are optically coupled to both switches 102 and 104.

System 100 further includes a built-in control circuit 110 that activates one of the two optical switches depending on the result of the selection process between the optical switches. During start up, switches 102 and 104, respectively, conduct self-tests to ensure proper operation and verify the integrity of the optical connections at the various transmit and receive channels or lines. During self-testing, switches 102 and 104 establish bi-directional communications via control circuit 110. In this example embodiment, control circuit 110 includes a first controller 112 and a second controller 114 that communicate via a set of control lines 113 and 115. Control lines 113 and 115 indicate the GO/NO-GO status of each of the optical switches and serve to couple the optical switches to one another. Control circuit 110 uses the start up program of each switch to determine the operating status of each switch. If both switches are operating properly, then control circuit 110 automatically selects primary switch 102 via high pin 102A as the default switch.

During start up, the switches set the status of control lines 113 and 115 to a NO-GO until self-testing of each of the switches is complete. Upon completing the self-test, first controller 112 changes the status of line 113 from NO-GO to GO if primary optical switch 102 is operating properly and the integrity of the line connections to the switch is acceptable. Optical switch 102 communicates the operating status of the optical switch to second controller 114. Secondary switch 104 changes the status of line 115 from NO-GO to GO if secondary optical switch 104 is operating properly after the self-test. Optical switch 104 communicates the operating status of optical switch to first controller 112. Where both the primary and secondary optical switches are operating properly, primary optical switch 102 responds as the default switch by immediately engaging and the secondary optical switch 104 becomes the backup switch.

If one optical switch fails the self-test, the status of the control line of the failed switch remains as NO-GO and the controller of the operative switch detects the NO-GO status of the failed switch. The operative optical switch then engages and completes initialization of system 100. Optical switches communicate bi-directionally before full optical communication commences in system 100. In an example embodiment, control lines 113 and 115 are included in a separate electrical backplane or co-located on a portion of optical backplane 108.

Figure 2:
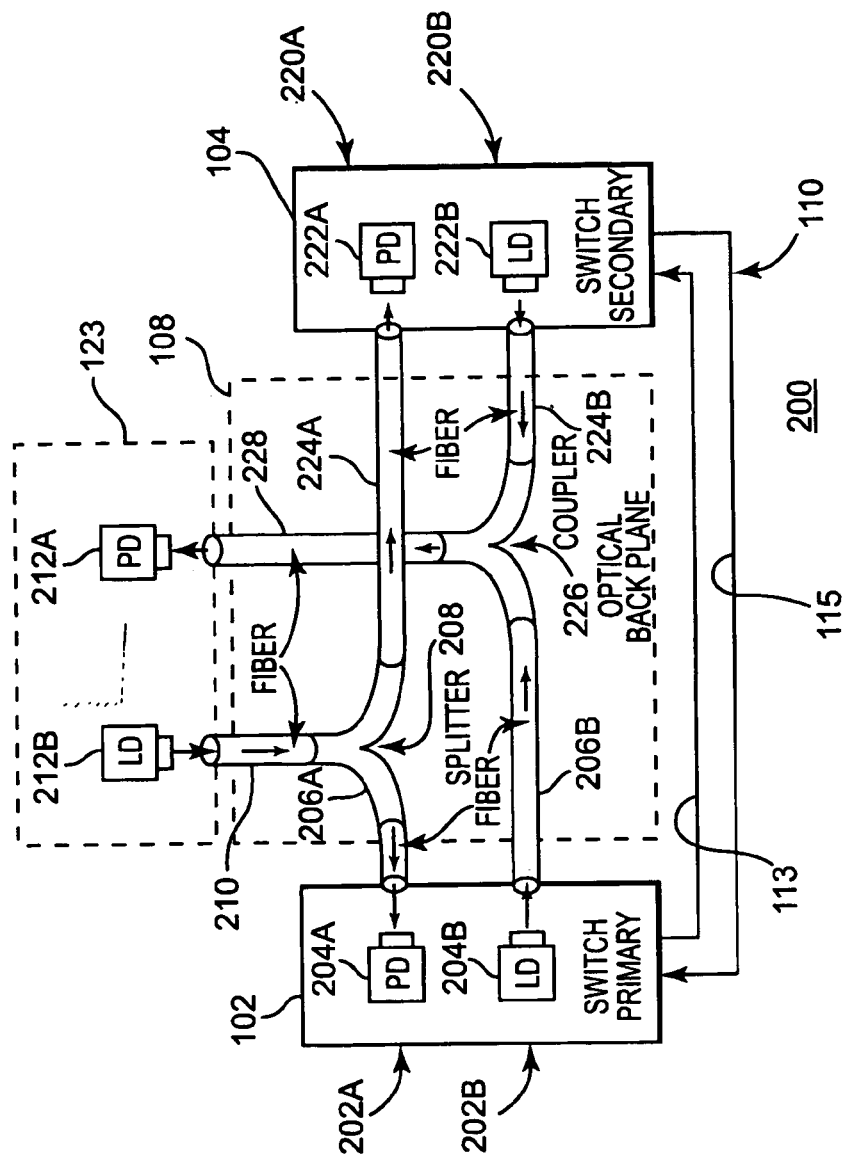
FIG. 2 is a block diagram of a fault tolerant optical switch interconnect made in accordance with an example embodiment of the present invention.

The manner in which switches 102 and 104 are coupled with each other and with devices 120–124 to appear as one optical switch during system 100 operation is described in further detail in the description of FIG. 2.

FIG. 2 is a block diagram of a fault tolerant optical switch interconnect 200 according to an example embodiment of the present invention. For the sake of brevity in the detailed description, common elements in FIG. 2 that correspond to similar elements in FIG. 1 are not repeated or re-labeled. Differences between the figures are labeled with new reference numerals. Interconnect 200 of FIG. 2 facilitates optical communication between a first node and a second node of system 100, such as between processor 120 and processor 122 of FIG. 1.

Node interface 123, which is coupled to node 122 (i.e., processor 122; FIG.1), couples switches 102 and 104 to the node. Transmit and receive channels 106A and 106B (FIG. 1) of primary optical switch 102 include a receiving channel 202A and a transmitting channel 202B for communicating through node interface 123. Transmit and receive channels 106A and 106B (FIG. 1) of secondary optical switch 104 include a receiving channel 220A and a transmitting channel 220B for communicating through node interface 123. Receiving channels 202A and 220A include photodiodes 204A and 222A, respectively, which receive optical signals from a communicating node via optical fibers 206A and 224A, respectively. Transmitting channels 202B and 220B include laser diodes 204B and 222B, respectively, which transmit light signals to a communicating node via optical fibers 206B and 224B, respectively.

Node interface 123 receives optical signals from switch 104 via a receiving photodiode 212A and an optical fiber 228 and transmits optical signals via a transmitting laser diode 212B from the communicating node into an optical fiber 210. Interconnect 200 includes an optical splitter 208 coupled to optical fiber 210 that passes the optical signal from laser diode 212B and provides an output that is coupled to receive channels 202A and 220A. An optical coupler 226 couples to optical fiber 228 and passes the optical signals from transmit channels 202B and 220B. At node interface 123, communication with either one of the optical switches of interconnect 200 is transparent to the communicating node coupled to interconnect 200 via node interface 123. The communicating node receives and transmits optical signals through respectively through optical fibers 210 and 228, but the communicating node does not know which of the optical switches is actually engaged and which is serving as backup.

In this example embodiment, control circuit 110 of interconnect 200 activates one of the optical switches depending on the outcome of the self-testing of the respective switches. Switch 102 communicates the operating status of the optical switch to switch 104 via control line 113 while switch 104 communicates the operating status of the optical switch to switch 102 via control line 115. In another embodiment, control circuit 110 is configurable to facilitate wireless communication between the optical switches.

Figure 3:
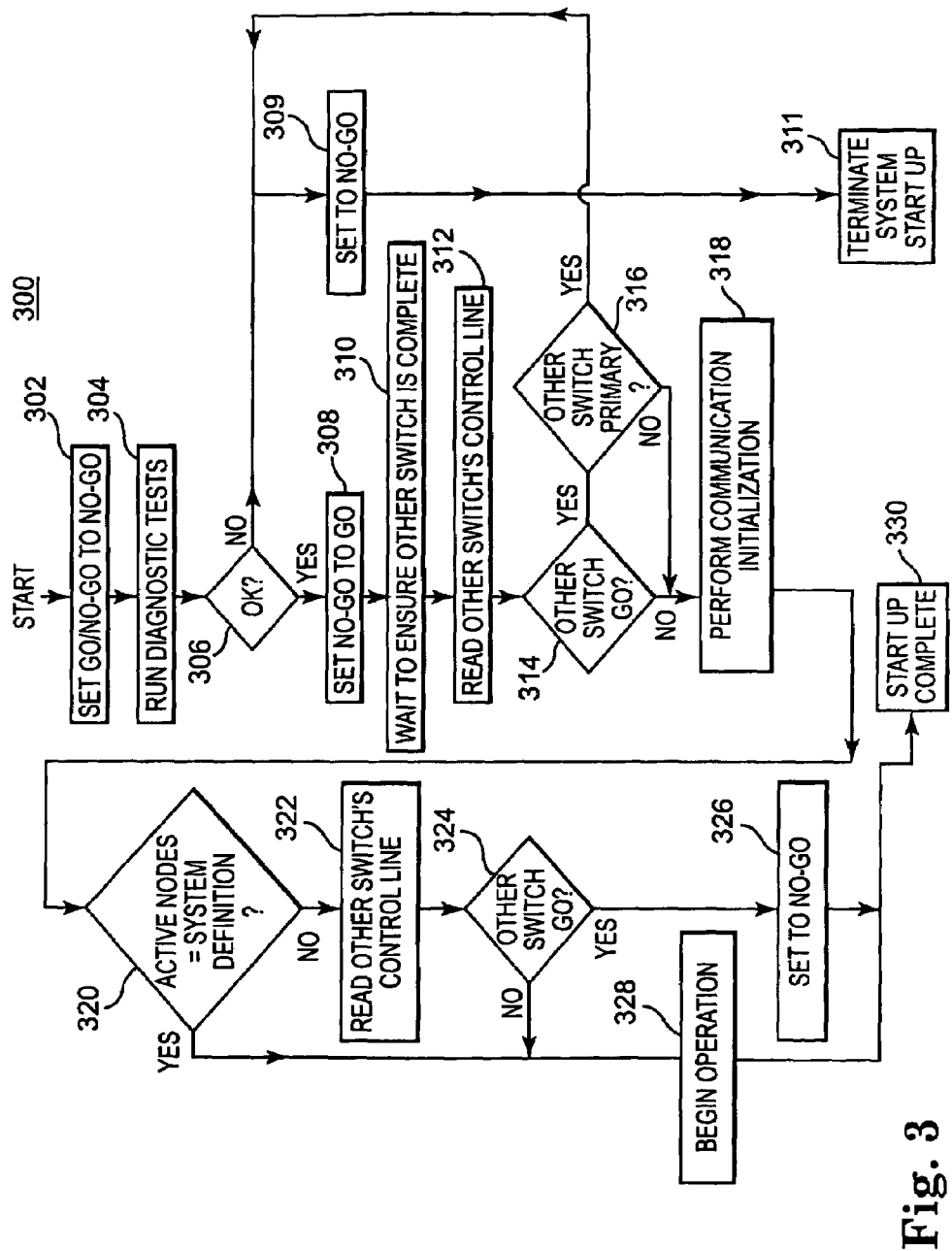
FIG. 3 is a flowchart of a process for verifying and selecting an operative optical switch before the optical communication system is initialized in accordance with an example embodiment of the present invention.

As applied to bidirectional communication between controllers 112 and 114, FIG. 3 is a flowchart of an example process 300 for verifying and selecting an operative optical switch during self-testing of the optical switches and before the optical communication system is initialized. This example process 300 verifies that the primary switch is operating properly and that the integrity of the line connections to the primary switch is acceptable. If these conditions are not met, the secondary switch engages immediately before full initialization of the optical communication system.

During self-testing of the optical switches, the optical switches at step 302 automatically set control lines 113 and 115 from GO/NO-GO to NO-GO. At step 304, the optical switches perform diagnostic tests and at step 306 the switches determine if the results of the diagnostic tests for each switch is acceptable. At step 308, the switches set control lines 113 and 115 from NO-GO to GO. If at step 306 the diagnostic tests are not acceptable, the switches leave control lines 113 and 115 at NO-GO status at step 309. At step 311, system initialization terminates at this point because both optical switches failed the self-test.

At step 310, control circuit 110 waits for both switches to complete the diagnostic tests. At step 312, each switch reads the control line setting of the other switch and at step 314 each switch determines whether the other switch is a GO. If the other switch is a NO-GO, process 300 continues to step 318 to perform communication initialization. If the other switch is a GO at step 314, the process continues to step 316 to determine if the other switch is the primary or secondary switch. If the other switch is the secondary switch, the process continues to step 318 to perform communication initialization. If the other switch is the primary switch at step 316, the process continues to step 309 and the switch sets the control line to a NO-GO status. At step 311, system 100 start up terminates.

At step 320, system 100 analyzes active nodes to determine nodes which correspond to the system definition. If the active nodes do correspond to the system definition, at step 328 the optical communication system commences operation. If the active nodes do not correspond to the system definition, the process continues to step 322 and one of the optical switches reads the other switch's control line status. If the other switch is a GO at step 324, the process continues to step 326 and one of the optical switches sets the control line of the other switch to NO-GO. The start up process is complete at this point because one of the switches is ready to engage. If the other switch is a not a GO at step 324, the process continues to step 328 and the optical communication system commences operation with this switch. At step 330, the start up process is complete.

The various embodiments of the present invention can support an optical switch interconnect backup on the nodes without incorporating additional hardware and there are no appreciable latency, bandwidth or connectivity problems when transitioning to the backup switch. In addition, the optical switches can be implemented in a redundant mode without incorporating additional hardware in the switches. Furthermore, the various embodiments taught herein can use passive optical components in the redundant paths to increase system reliability and lower system complexity and cost.

The present invention is believed to be applicable to a variety of applications involving optical communication systems that include optical backplanes. The controllers of the control circuit of the present invention can be implemented in various ways using programmable and semi-programmable integrated circuit devices. For example, a programmable device such an FPGA (Field Programmable Gate Array) can be used to form the control circuit. Other aspects and embodiments of the present invention beyond those specifically described herein will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An arrangement adapted for optical communication between first and second nodes, the optical communication arrangement comprising:
   a first optical switch having first-switch transmit and receive channels and a second optical switch having second-switch transmit and receive channels, each of the first and second optical switches adapted to conduct a self-test and indicate whether the self-test has failed;
   an optical coupler adapted to receive the first-switch and second-switch transmit channels and to provide an output for transmit to at least one of the first and second nodes;
   an optical splitter adapted to receive an optical signal coupled from at least one of the first and second nodes and to provide an output coupled to the first-switch and second-switch receive channels; and
   a control circuit configured and arranged to activate one of the first and second optical switches in response to the other of the first and second optical switches conducting the self-test, wherein the control circuit includes a first subcircuit coupled to the first optical switch and a second subcircuit coupled to the second optical switch and coupled to the first subcircuit, and the first subcircuit provides a first self-test-result signal to the second subcircuit, and the second subcircuit provides a second self-test result signal to the first subcircuit.

2. The arrangement of claim 1, wherein the first subcircuit controls the first optical switch and the second subcircuit controls the second optical switch.

3. The arrangement of claim 2, wherein each of the first and second subcircuits is configured and arranged to bi-directionally communicate with the other of the first and second subcircuits and to establish only one of the first and second subcircuits being active.

4. The arrangement of claim 2, wherein the second subcircuit is adapted to activate the second optical switch upon receiving a signal from the first subcircuit that the first optical switch is in a failure mode.

5. The arrangement of claim 2, wherein said one of the first and second optical switches activates in response to neither of the first and second optical switches indicating that the self-test has failed.

6. The arrangement of claim 1, wherein the control circuit is further configured and arranged to activate one of the first and second optical switches in response to the other of the first and second optical switches indicating that the self-test has failed.

7. An arrangement adapted for optical communication with a first node comprising:
a first optical switch having first-switch transmit and receive channels and a second optical switch having second-switch transmit and receive channels, at least one of the first and second optical switches adapted to conduct a self-test and indicate whether the self-test has failed;
an optical coupler adapted to receive the first-switch and second-switch transmit channels and to provide an output for transmit to the first node;
an optical splitter adapted to receive an optical signal coupled from the first node and to provide an output coupled to the first-switch and second-switch receive channels; and
a control circuit configured and arranged to activate one of the first and second optical switches in response to the other of the first and second optical switches conducting the self-test, wherein the control circuit includes a first subcircuit coupled to the first optical switch and a second subcircuit coupled to the second optical switch and coupled to the first subcircuit, and the first subcircuit provides a first self-test-result signal to the second subcircuit, and the second subcircuit provides a second self-test result signal to the first subcircuit.

8. The arrangement of claim 7, further comprising:
a second optical coupler adapted to receive the first-switch and second-switch transmit channels and to provide an output for transmit to a second node; and
a second optical splitter adapted to receive an optical signal coupled from the second node and to provide an output coupled to the first-switch and second-switch receive channels.

9. The arrangement of claim 8, wherein the control circuit is further configured and arranged to activate one of the first and second optical switches in response to the other of the first and second optical switches indicating that the self-test has failed.

10. The arrangement of claim 8, wherein said one of the first and second optical switches activates in response to neither of the first and second optical switches indicating that the self-test has failed.

11. An arrangement adapted for optical communication between first and second nodes, the optical communication arrangement comprising:
first optical communication means having first-switch transmit and receive channels and second optical communication means having second-switch transmit and receive channels, each of the transmit and receive communication means for respectively sending and receiving optical signals and at least one of the first and second optical communication means for conducting a self-test and indicating whether the self-test has failed;
optical coupling means for receiving the first-switch and second-switch transmit channels and for providing an output to transmit to at least one of the first and second nodes;
optical splitting means for receiving an optical signal coupled from at least one of the first and second nodes and for providing an output coupled to the first-switch and second-switch receive channels; and
control means for activating one of the first and second optical communication means in response to the other of the first and second optical communication means conducting the self-test, wherein the control means includes a first subcircuit coupled to the first optical communications means and a second subcircuit coupled to the second optical communications means and coupled to the first subcircuit, and the first subcircuit provides a first self-test-result signal to the second subcircuit, and the second subcircuit provides a second self-test result signal to the first subcircuit.

12. The arrangement of claim 11, wherein the control means includes means for activating one of the first and second optical communication means in response to a pre-programmed default mode for said one of the first and second optical communication means and in response to neither of the first and second optical communication means indicating that the self-test has failed.

13. The arrangement of claim 11, wherein the output of said optical coupling means transmits to the first node and said optical splitting means receives an optical signal coupled from the first node.

14. The arrangement of claim 13, further comprising:
second optical coupling means for receiving the first-switch and second-switch transmit channels and for providing an output for transmit to a second node; and
a second optical splitting means for receiving an optical signal coupled from the second node and for providing an output coupled to the first-switch and second-switch receive channels.

15. An optical switch arrangement, comprising:
a first optical switch having a plurality of first-switch transmit channels and a plurality of first-switch receive channels, and a second optical switch having a plurality of second-switch transmit channels and a plurality of second-switch receive channels, each of the first and second optical switches adapted to perform a self-test and output a respective self-test-result signal that indicates success or failure of the respective self-test;
a plurality of optical couplers, each optical coupler coupled to a respective first-switch transmit channel and a respective second-switch transmit channel and adapted to provide an optical output signal;

a plurality of optical splitters, each optical splitter coupled to a respective first-switch receive channel and a respective second-switch receive channel and adapted to split an input optical signal and provide an output optical signal to the respective first-switch receive channel and second-switch receive channel; and a control circuit coupled to the first and second optical switches, the control circuit adapted activate one and deactivate the other of the first and second optical switches in response to states of the self-test-result signals, wherein the control circuit includes a first subcircuit coupled to the first optical switch and a second subcircuit coupled to the second optical switch and coupled to the first subcircuit, and the first subcircuit provides a first self-test-result signal to the second subcircuit, and the second subcircuit provides a second self-test result signal to the first subcircuit.

16. The optical switch arrangement of claim 15, wherein the first subcircuit activates the first optical switch and the second subcircuit deactivates the second optical switch in response to the first self-test-result signal indicating a successful self-test.

17. The optical switch arrangement of claim 15, wherein the second subcircuit activates the second optical switch and the first subcircuit deactivates the first optical switch in response to the second self-test-result signal indicating a successful self-test and the first self-test-result signal indicating a failed self-test.

* * * * *